Figures 1, 2:
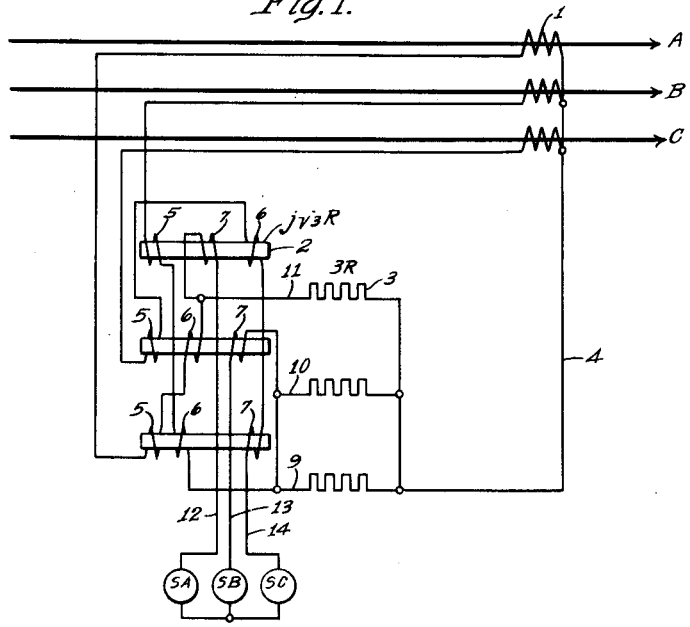

Feb. 2, 1943.   B. E. LENEHAN   2,309,649
PHASE-SEQUENCE RELAYING EQUIPMENT
Filed Dec. 30, 1941

WITNESSES:

INVENTOR
*Bernard E. Lenehan.*
BY
ATTORNEY

Patented Feb. 2, 1943

2,309,649

UNITED STATES PATENT OFFICE 2,309,649

PHASE-SEQUENCE RELAYING EQUIPMENT

Bernard E. Lenehan, Bloomfield, N. J., assignor to Westinghouse Electric & Manufacturing Company, East Pittsburgh, Pa., a corporation of Pennsylvania Application December 30, 1941, Serial No. 424,937

16 Claims. (Cl. 172—245)

My invention relates to relaying equipments and other electro-responsive equipments in which a phase-sequence response is required, and it has particular relation to phase-sequence networks and connections, particularly those which provide all three phases of either the positive-sequence components or the negative-sequence components of a three-phase line-current or other electrical quantity derived from a three-phase line.

Previously used phase-sequence networks or filters have derived a positive or a negative phase-sequence component from the three-phase line-current or other electrical quantity of the line, but they have derived only one phase of said phase-sequence component, that is, a phase-sequence component having one of the line-phases as its principal phase or phase of reference. There are many situations, among which will be specially mentioned certain relaying systems, notably in connection with the ground-fault phase-selectors which are utilized in a single-pole tripping-system covered by an application of S. L. Goldsborough, Serial No. 424,957, filed Dec. 30, 1941, requiring three derivations of a single-phase sequence-component, either the positive or the negative-sequence component, with different phases for the principal phases thereof; and it has been found to be difficult or impossible to connect three of any previously known sequence-filters to one set of line-current transformers, thus requiring three sets of transformers.

It is an object of my invention to provide a phase-sequence filter which is capable of delivering all three phases of either one of the rotational (as distinguished from the zero) phase-sequence components, that is, either the negative or the positive phase-sequence component of the input-currents.

With the foregoing and other objects in view, my invention consists in the parts, elements, circuits, systems, methods and combinations hereinafter described and claimed, and illustrated in the accompanying drawing, wherein Figure 1 is a diagrammatic view of circuits and apparatus illustrating my invention in a form of embodiment which is for many purposes the preferable form of embodiment of my invention, although the general principles thereof are obviously susceptible to the use of other circuit-connections, and Fig. 2 is a similar view showing other connections.

I have illustrated my invention as being utilized for the purpose of deriving the three negative-phase-sequence components from the three-phase line-currents of a three-phase line A, B, C. The line currents are derived from a bank of star-connected line-current transformers 1, and are supplied to a network or filter which is illustrated as being composed of mutual-reactance devices 2 and resistors 3. In the embodiment of my invention shown in Fig. 1, there are three mutual-reactance devices 2, and three star-connected resistors 3, with the star-point of the resistors connected to the star-point of the current-transformers through a neutral circuit 4.

In accordance with my invention, the three different phases of the negative-sequence current-component are to be supplied to three similar coils SA, SB and SC of the electro-responsive means which may be single-phase relay-coils or other windings of any other electro-responsive equipment. In general principle, my filter utilizes the voltages from the three star-connected resistors, and, for a second component, mutual induced voltages with secondaries connected for 90° phase-shift. There are various connections for bringing about this general result. In Fig. 1, each of the reactors 2 has two primary windings 5 and 6, and a single secondary winding 7, these three windings all having the same number of turns and having a mutual reactance $j\sqrt{3}R$, as compared to a resistance-value of 3R for each of the three resistors 3.

One primary winding, 5 or 6, of each of two of the reactors 2, and one of the three resistors 3, is energized from each phase of the line-current, as illustrated, and the three secondary windings 7 are connected between the respective phase-terminals 9, 10, 11 of the resistors, and the different phase-terminals 12, 13, 14 of the three single-phase relaying-circuits or coils SA, SB and SC, the latter being connected in star with no return-path for zero-sequence currents. The connections are such that each negative-sequence phase, as obtained in the respective filter-terminals 12, 13 and 14, responds to $j\sqrt{3}R$ times (the difference between the line-currents in two of the line-conductors A, B and C), plus 3R times the line-current in the remaining phase or conductor. More specifically, in the particular embodiment which is illustrated in Fig. 1, the principal phase of the derived negative-sequence component corresponds to the phase of the line-current which passes through the resistor whose voltage-drop is combined with the voltage of one of the secondary windings 7 to obtain the phase-sequence response. For example, the phase-C negative-sequence current, or the negative-sequence component with phase-C for its principal phase, is derived in the terminal 14, from the voltage induced in the secondary winding 7 of the third reactor 2, plus the voltage obtained in the terminal 10 of the second resistor 3. The secondary winding 7 of the third reactor is responsive to the reactance-drops in the two primary windings 5 and 6 of said third reactor, said primary windings being energized from the phase-A and phase-B line-currents respectively. The second resistor 3, having the terminal 10, is energized from the phase-C line-current.

The phase-sequence components which are produced in my three-phase network as shown in Fig. 1 eliminate the positive-sequence current-components, but they contain a mixture of voltages of the negative-sequence component and the zero-sequence component; but the circuit-connections for utilizing the derived phase-sequence components of the filter or network are such as to eliminate the zero-sequence currents, because no return-path is provided for three zero-sequence currents, that is, for three currents in phase with each other, in the relay-coils SA, SB and SC.

While I have particularly described my invention with reference to a derivation of the negative-sequence component substantially mixed with the positive or zero-sequence components, it will be readily understood, that, by a simple change in connections, the positive-sequence component will be obtained.

It will be noted that I have provided a single compact network, having only a small number of elements, imposing only a relatively small volt-ampere burden; and that I have obtained all three phases of the negative-sequence symmetrical line-current component from a single set of line-current transformers.

It will be understood that any equivalent connections may be utilized, rather than the precise connections which have been shown in Fig. 1. The Fig. 1 connections are convenient for using the three-winding reactors 2 which have previously been developed and employed in connection with single-phase negative-sequence networks of the type shown in my Patent No. 2,161,-829 of June 13, 1939, but there are many other connections and arrangements for obtaining, in effect, the same response.

Thus, in Fig. 2, I have illustrated a convenient network utilizing three reactors 22, each having only two windings, namely, a primary winding 25 and a secondary winding 27. As in Fig. 1, each of the reactors has a reactance $j\sqrt{3}R$, as compared to a resistance 3R of each of the star-connected resistors 3. The primary windings 25 are connected in star in series-circuit relation to the respective phases of the secondary windings of the current-transformers 1, between said current-transformers and the terminals 9, 10 and 11 of the star-connected resistors 3. The three secondary windings 27 of the reactors are connected in delta and are utilized as a source of three-phase voltages which are delivered from terminals 29, 30 and 31. Since the delta voltages of a star-delta transformer are equal to the respective differences of the several pairs of star-voltages, it will be observed that my secondary reactor-terminals 29, 30 and 31, in Fig. 2, constitute sources of voltages of which each phase is equal to the mutual reactance of the several reactors, multiplied by the difference between two of the line-currents.

In Fig. 2, it is necessary, therefore, for my network to have two sets of three-phase terminals, namely, the resistance-responsive terminals 9, 10 and 11, and the reactance-responsive terminals 29, 30 and 31, the several current-responsive coils SA, SB and SC being connected between these two sets of terminals, as plainly illustrated. In this way, for example, the SA-coil is impressed with a resultant voltage which is the algebraic sum of the resistance-drop $3RI_A$ and the reactance-drop $j\sqrt{3}R(I_C - I_B)$, which is the same response obtained in Fig. 1. It will also be noted that the connections of the negative-sequence coils SA, SB and SC are such that no path is provided for zero-sequence currents.

It will be noted that it is a general or underlying idea of my invention to obtain three-phase voltages from star-connected resistors, and a second three-phase voltage-component obtained from mutual reactances which produce voltages with a 90° phase-shift with respect to the resistor-voltages, the reactor-connections being such that the reactor-voltage which is utilized, in each case, is the difference between the reactor-voltage drops in the two current-phases other than the current-phase which energizes the corresponding resistor.

While I have illustrated my invention in only two illustrative forms of embodiment, I desire it to be understood that my invention is not limited to these particular connections, but I contemplate that any means can be used for obtaining substantially the equivalent effect, thus obtaining a three-phase, phase-sequence network, that is, a network which is capable of delivering all three phases of a selected rotational phase-sequence quantity, either the positive-sequence quantity or the negative-sequence quantity, depending upon the order of the connections.

I claim as my invention:

1. Phase-sequence electro-responsive equipment comprising: means for deriving a three-phase electrical quantity; a phase-sequence filter comprising a plurality of reactors and a plurality of resistors; circuit-means for energizing the resistors and the reactors from the various phases of the derived three-phase electrical quantity in such manner as to produce two sets of three-phase voltage-components, one responsive to resistor-drops and the other responsive to the differences between different pairs of reactor-drops; three equipment-circuits; and means for serially combining the corresponding phases of the two sets of three-phase voltage-components in such manner as to energize the corresponding phases of the equipment-circuits from the resultant voltages; the relative magnitudes of the voltage-components being such as to practically eliminate one of the rotational symmetrical components from the set of three resultant voltages, and the circuit-connections of the equipment-circuits being such as to substantially prevent the flow of zero-sequence current therethrough.

2. Phase-sequence electro-responsive equipment comprising: means for deriving a three-phase electrical quantity; a phase-sequence filter comprising a plurality of reactors having primary and secondary windings, and three star-connected resistors; circuit means for energizing the resistors and the primary windings of the reactors from the various phases of the derived three-phase electrical quantity; the reactor-connections being such as to produce a set of secondary-winding voltages responsive to the differences between different pairs of reactor-drops due to currents in different primary-winding phases; three equipment-circuits; and means for serially connecting the respective secondary-winding phases and the respective equipment-circuit phases to the respective terminals of the star-connected resistors.

3. Phase-sequence electro-responsive equipment comprising: means for deriving a three-phase electrical quantity; a phase-sequence filter comprising a plurality of reactors having primary and secondary windings, and a plurality of resistors; three equipment-winding circuits connected so that substantially no zero-sequence currents can flow therethrough; circuit-means for energizing the resistors and the primary windings of the reactors from the various phases of the derived three-phase electrical quantity; and means for serially combining the voltage-drops in the various resistors and the voltages induced in the various secondary windings of the reactors in such manner as to provide each of the three equipment-winding circuits with a resultant voltage having components responsive to each of the three phases of the derived three-phase electrical quantity in such proportions as to practically eliminate one of the rotational symmetrical components from the set of three resultant voltages.

4. Phase-sequence electro-responsive equipment comprising: means for deriving a three-phase electrical quantity; a phase-sequence filter comprising a plurality of reactors having primary and secondary windings, and three star-connected resistors; said phase-sequence filter having a set of three-phase output-terminals; circuit means for energizing the resistors and the primary windings of the reactors from the various phases of the derived three-phase electrical quantity; circuit-means for connecting the secondary windings of the reactors between the three-phase output-terminal of the filter and the terminals of the star-connected resistors in such manner, in effect, as to add to each phase of the resistor-voltages, a reactor-voltage including responses to each of the other phases of the derived three-phase electrical quantity, the relative proportions being such as to practically eliminate one of the rotational symmetrical components, but not the zero-sequence component, from the voltages appearing at the three output-terminals of the filter; and a three-phase winding-circuit of the electro-responsive equipment connected to the three output-terminals of the filter in such manner as to substantially prevent the flow of zero-sequence currents in the three phases of the equipment-windings.

5. Phase-sequence electro-responsive equipment comprising three equipment-circuits, means for deriving a three-phase electrical quantity from which three derivations of a single phase-sequence component are to be derived with different phases for the principal phases thereof, three plural-winding reactors, each reactor having one or more primary windings and one or more secondary windings, three resistors, circuit-means for energizing the primary windings of the reactors and the resistors from the three-phase electrical quantity, circuit means for providing polyphase phase-sequence terminals energized from different combinations of the voltages across the resistors and the secondary windings of the reactors, and circuit-means for energizing the equipment-circuits from the polyphase phase-sequence terminals in such manner as to provide no return-path for zero-sequence currents.

6. Phase-sequence electro-responsive equipment comprising three equipment-circuits connected in such circuit-relation that there is no return-path for zero-sequence currents, means for deriving a three-phase electrical quantity from which three derivations of a single phase-sequence component are to be derived with different phases for the principal phases thereof, three three-winding reactors, three resistors, circuit means for energizing one winding of each of two reactors and one resistor from each phase of the three-phase electrical quantity, and circuit-means for energizing each equipment-circuit responsively to the sum of the voltages across one of the resistors and the third winding of one of the reactors.

7. Phase-sequence electro-responsive equipment comprising three equipment-circuits connected in star with no return-path for zero-sequence currents, means for deriving a three-phase electrical quantity from which three derivations of a single phase-sequence component are to be derived with different phases for the principal phases thereof, three-winding reactors, three star-conunected resistors, circuit-means for energizing one winding of each of two reactors and one resistor from each phase of the three-phase electrical quantity, and circuit-means for connecting the third winding of one of the reactors between one phase-terminal of the equipment-circuits and one phase-terminal of the resistors.

8. Phase-sequence electro-responsive equipment comprising three equipment-circuits connected with no return-path for zero-sequence currents, means for deriving a three-phase electrical quantity from which three derivations of a single phase-sequence component are to be derived with different phases for the principal phases thereof, three two-winding reactors, three star-connected resistors, circuit-means for energizing one resistor and the primary winding of one reactor from each phase of the three-phase electrical quantity, circuit-means for connecting the secondary windings of the three reactors in delta so as to provide three secondary reactor-terminals, and circuit-means for connecting the several equipment-circuits between the several phase-terminals of the resistors and the several secondary reactor-terminals.

9. The invention as defined in claim 1, characterized by said derived three-phase electrical quantity being currents.

10. The invention as defined in claim 2, characterized by said derived three-phase electrical quantity being currents.

11. The invention as defined in claim 3, characterized by said derived three-phase electrical quantity being currents.

12. The invention as defined in claim 4, characterized by said derived three-phase electrical quantity being currents.

13. The invention as defined in claim 5, characterized by said derived three-phase electrical quantity being currents.

14. Phase-sequence electro-responsive equipment comprising three equipment-circuits connected in such circuit-relation that there is no return-path for zero-sequence currents, means for deriving a three-phase line-current from which three derivations of a single phase-sequence component are to be derived with different phases for the principal phases thereof, three three-winding reactors, three resistors, circuit-means for energizing one winding of each of two reactors and one resistor from each phase of the three-phase line-current, and circuit-means for energizing each equipment-circuit responsively to the sum of the voltages across one of the resistors and the third winding of one of the reactors.

15. Phase-sequence electro-responsive equipment comprising three equipment-circuits connected in star with no return-path for zero-sequence currents, means for deriving a three-phase line-current from which three derivations of a single phase-sequence component are to be derived with different phases for the principal phases thereof, three three-winding reactors, three star-connected resistors, circuit-means for energizing one winding of each of two reactors and one resistor from each phase of the three-phase line-current, and circuit-means for connecting the third winding of one of the reactors between one phase-terminal of the equipment-circuits and one phase-terminal of the resistors.

16. Phase-sequence electro-responsive equipment comprising three equipment-circuits connected with no return-path for zero-sequence currents, means for deriving a three-phase line-current from which three derivations of a single phase-sequence component are to be derived with different phases for the principal phases thereof, three two-winding reactors, three star-connected resistors, circuit-means for energizing one resistor and the primary winding of one reactor from each phase of the three-phase line-current, circuit-means for connecting the secondary windings of the three reactors in delta so as to provide three secondary reactor-terminals, and circuit-means for connecting the several equipment-circuits between the several phase-terminals of the resistors and the several secondary reactor-terminals.

BERNARD E. LENEHAN.